(12) United States Patent
Marshall et al.

(10) Patent No.: US 7,563,124 B1
(45) Date of Patent: Jul. 21, 2009

(54) HARVESTING POWER FROM LOW-VOLTAGE OVERHEAD POWER CABLES

(75) Inventors: Patrick T. Marshall, Tipp City, OH (US); Michael W. McKinley, Xenia, OH (US); Charley Brun, Jr., Xenia, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 12/154,812

(22) Filed: May 21, 2008

(51) Int. Cl.
  *H01R 4/24* (2006.01)
(52) U.S. Cl. ........................ 439/389; 30/90.4
(58) Field of Classification Search .............. 439/389, 439/391; 29/868, 860, 825; 228/173.2; 30/90.1, 30/90.4, 90.6, 90.7, 204, 294; 7/101, 107; 269/45
  See application file for complete search history.

(56) References Cited

U.S. PATENT DOCUMENTS

| | | | | |
|---|---|---|---|---|
| 3,100,935 A | * | 8/1963 | Hargrave | 30/294 |
| 3,162,945 A | * | 12/1964 | Stabs | 30/90.4 |
| 3,614,904 A | * | 10/1971 | Young et al. | 30/90.1 |
| 4,189,799 A | * | 2/1980 | Litehizer, Jr. | 7/107 |
| 4,433,484 A | * | 2/1984 | Antisdel et al. | 30/90.4 |
| 4,472,877 A | * | 9/1984 | Undin et al. | 30/90.7 |
| 5,058,869 A | * | 10/1991 | Ruthven | 269/45 |
| 5,142,780 A | * | 9/1992 | Brewer | 30/294 |
| 5,361,496 A | * | 11/1994 | DeBoalt | 30/90.6 |
| 5,368,501 A | * | 11/1994 | Asbell | 439/418 |
| 5,896,667 A | * | 4/1999 | Hawkins | 30/294 |
| 6,125,533 A | * | 10/2000 | Warner et al. | 29/868 |
| 6,510,611 B2 | * | 1/2003 | Edwards et al. | 30/90.6 |
| 6,691,403 B1 | * | 2/2004 | Murg | 29/825 |
| 6,813,981 B2 | * | 11/2004 | Urban et al. | 83/13 |
| 7,137,204 B2 | * | 11/2006 | Wiste | 30/90.1 |

* cited by examiner

*Primary Examiner*—Alexander Gilman
(74) *Attorney, Agent, or Firm*—AFMCLO/JAZ; Gina S. Tollefson

(57) ABSTRACT

Harvesting power from low-voltage overhead power transmission lines for recharging batteries for use in battery-operated equipment used in urban and remote geographic locations used by military Special Forces, firefighters and remote rescue teams. An elongated metal head containing a razor attached to electrical wire is thrown over an overhead power line where it cuts through insulated cable, makes contact with the hot line, and establishes an electrical connection in order transfer low voltage power to batteries or equipment.

15 Claims, 6 Drawing Sheets

HARVESTING POWER FROM LOW-VOLTAGE OVERHEAD POWER CABLES

RIGHTS OF THE GOVERNMENT

The invention described herein may be manufactured and used by or for the Government of the United States for all governmental purposes without the payment of any royalty.

BACKGROUND OF THE INVENTION

The invention relates to recharging battery-operated equipment used by remote rescue teams, and more specifically, harvesting power from low-voltage overhead power transmission lines to recharge such battery-operated equipment.

Energy capacity of batteries means a great deal to military ground forces and other remote rescue teams. This is especially true when the conflict being supported largely involves special operational forces on the ground that serve as a link between air and ground forces. These Special Forces designate targets for air strikes. They do so using methods such as laser designators, which require a tremendous amount of battery power. They also carry other battery-powered items in their battlefield air operations kits, such as laser range finders, GPS equipment, radio equipment to talk to aircraft, laptops and night vision equipment. Malfunctions of some of this equipment cost lives in the twenty-first century conflicts.

One of the major limiting factors for all remote rescue teams is battery energy capacity. Missions have to be planned around these very limited battery lifetimes and military forces and rescue teams then have to be re-supplied with fresh sets of batteries. Another major focus in every discussion on battery technology is how to make batteries weigh less. Weight is everything to a soldier or a remote rescuer. In every survey of military ground soldiers, one of the frequent complaints is that they have too much to carry. Today's soldier carries between 80 and 100 pounds of equipment on their back when they go out into the field. They often have to dump weight to successfully see a mission through. With regard to battery weight, the immediate goal is to reduce battery weight, currently averaging 30 pounds, by 50 percent.

As is disclosed and claimed in the present invention, one method to reduce battery weight is to use smaller energy-capacity rechargeable batteries, which weigh dramatically less, and recharge them more often using overhead electric power transmission lines. Another option is to bypass the batteries entirely using overhead electric transmission lines to supply power directly to various pieces of equipment.

Most countries use power line cables called "duplex" or "triplex" to run the stepped-down, low voltage (LV) power, from a transformer to residential homes, farms, commercial businesses and shipyards, etc. An example triplex cable is shown in FIG. 1. It consists of three cables twisted together; two of these cables are insulted 100 since they are hot (i.e., 110V-240V each). The third cable is the neutral line 101 that is usually bare since it is made of rust-resistant metal such as aluminum or copper. The neutral line has no insulation which means less weight and it also acts as support for the other two "hot" lines.

Most foreign countries use duplex power cables, an example of which is shown in FIG. 2. Duplex power cables consist of only two cables twisted together. One of the cables is insulated and hot 200 (i.e., 110V-240V) and the second cable is the neutral line 201 that is usually bare since it is made of rust-resistant metal such as aluminum or copper and functions in the same manner as the neutral line from a triplex cable. The United States uses mostly triplex cables but also uses duplex cables for stop lights and street lights. FIG. 3 depicts a standard electric utility pole with an attached step-down transformer 302 that converts the high voltage (HV) lines 301 to low voltage lines 300. In this case, triplex cable 300 is used to run the low voltage power to the user's facility.

The present invention addresses the problems of weight for the military soldier and at the same time provides power for hand held equipment. The present invention, titled the Remote Apparatus Power System (RAPS) could potentially allow forward operational military forces to survive almost indefinitely out in the field since battery energy limitations and weight are no longer problems.

SUMMARY OF THE INVENTION

Harvesting power from low-voltage overhead power transmission lines for the purpose of recharging batteries for use in battery-operated equipment or use in directly recharging equipment in urban and remote geographic locations used by military special forces, firefighters and remote rescue teams. An elongated metal head containing a razor attached to electrical wire is thrown over an overhead power line where it cuts through insulated cable, makes contact with the hot line, and establishes an electrical connection in order transfer low voltage power to batteries or equipment.

It is therefore an object of the invention to provide a method and device for utilizing power from low-voltage overhead power transmission lines for the purpose of recharging batteries.

Another object of the invention is to provide a method and device for utilizing power from low-voltage overhead power transmission lines for the purpose of recharging batteries in urban and remote geographic locations for use in battery-operated equipment used by military Special Forces, firefighters and remote rescue teams.

Another object of the invention is to provide a method and device for utilizing power from low-voltage overhead power transmission lines for directly recharging electronic equipment.

It is another object of the invention to provide an elongated metal head containing a razor attached to N-gauge wire to throw over and hook onto an overhead power line where it cuts through insulated cable and established an electrical connection to the batteries or equipment.

These and other objects of the invention are achieved by the description, claims and accompanying drawings and by a method for obtaining power from low-voltage, overhead power cables for recharging batteries and hand-held equipment comprising the steps of:

throwing a weighted, elongated metal housing up and over a low-voltage power cable, said metal housing containing a cutout on said elongated side for seating a razor blade connected to a first N-gauge wire;

grounding said metal housing by connecting a second N-gauge wire thereto which is connected to an aluminum metal ground stake;

cutting insulation of said low voltage overhead power cable using said razor blade by pulling said first and second N-gauge wires and electrically connecting to a hot line of said power cable;

providing constant tension to said elongated metal housing to maintain an electrical connection to said power cable hot line using said aluminum metal ground stake connected to said metal housing by said support cable; and supplying low voltage electrical power to charge batteries or equipment from said hot line of said power cable through said N-gauge wire connected to said razor blade in said metal housing.

DETAILED DESCRIPTION

Figure 1:
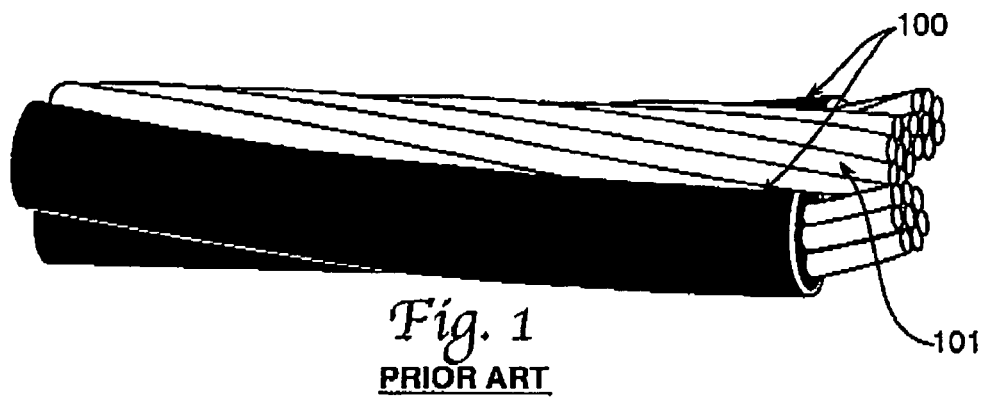
FIG. 1 shows a triplex power line cable.
Figure 2:
FIG. 2 shows a duplex power line cable.
Figure 3:
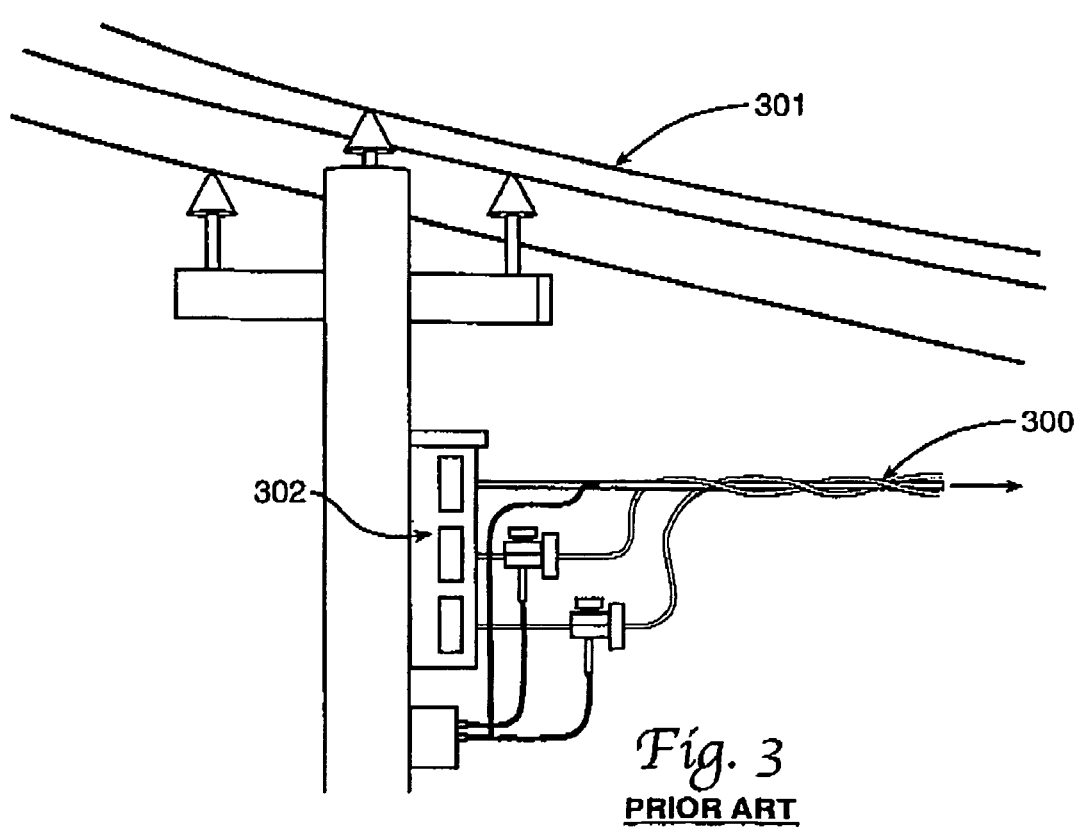
FIG. 3 shows a common triplex configuration from power line poles.
Figure 4:
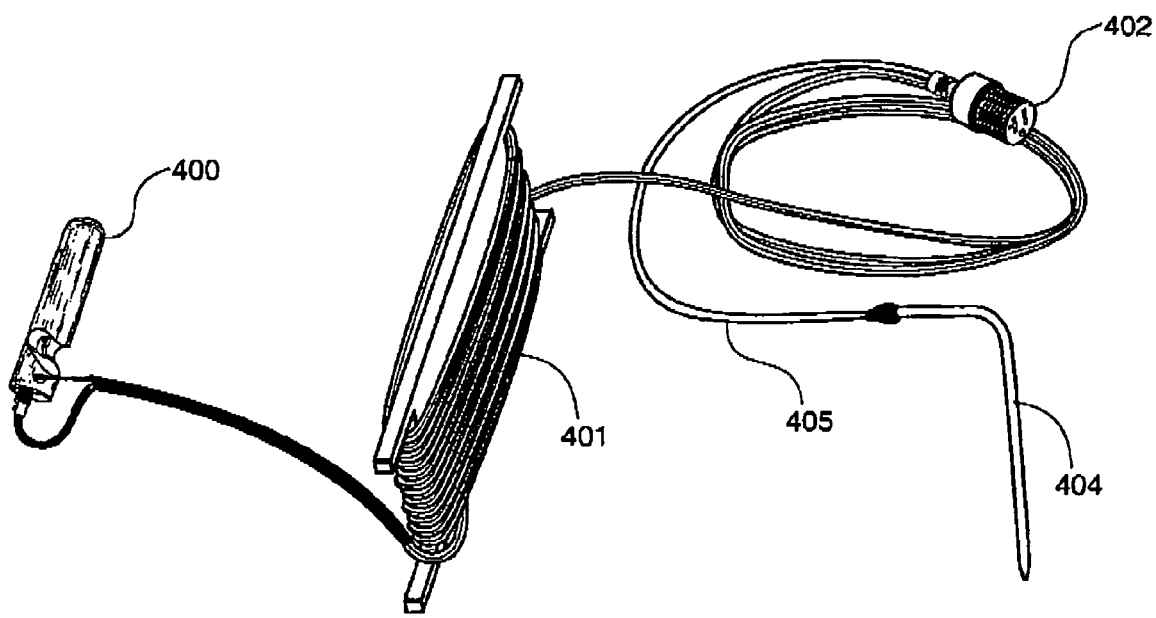
FIG. 4 shows a sketch of a preferred arrangement of the subject invention.
Figure 5:
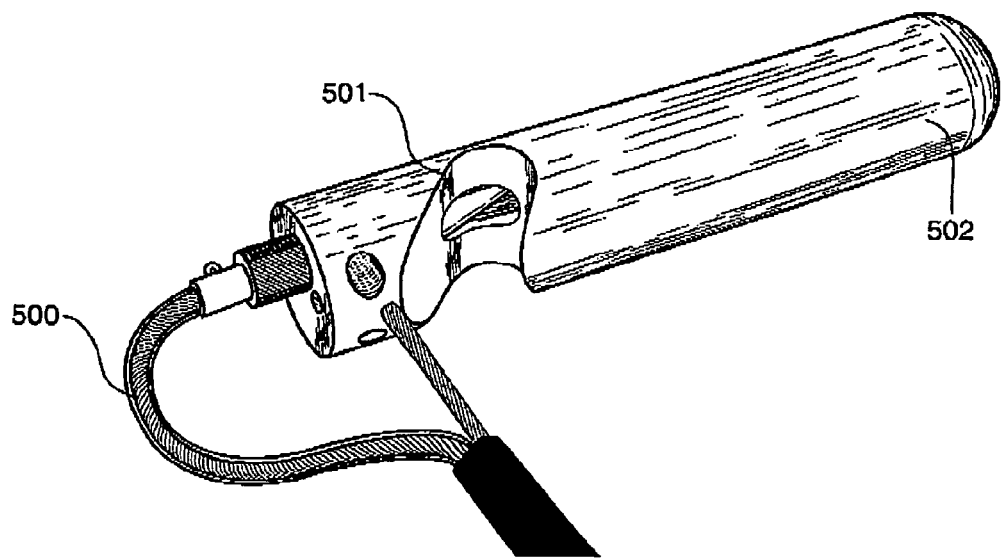
FIG. 5 shows a sketch of a close up of the head and blade of the arrangement of FIG. 4.

FIG. 4 shows a sketch of a preferred arrangement of the invention. A low-voltage alternating current (AC) remote apparatus power system is shown in FIG. 4 with the head shown at 400, a female AC plug shown at 402, a spool of 12 GA wire shown at 401, wire tension adjustment shown at 405 and a ground stake shown at 404. A close up sketch of the head of FIG. 4 is illustrated in FIG. 5 with a razor blade shown at 501, N-gauge (GA) wire 500 electrically connected to the razor blade at 501. The razor blade at 501 and the support cable are electrically connected to the head and the other 12 GA wire (not shown) at 502. The "head" is the invention's main component and it is a metal device which incorporates a razor blade used to cut through the insulation of overhead cables and then make an electrical connection to the hot line of the overhead low voltage cable. The other end of the blade (not shown) is electrically connected to one of two N-GA wires. The general phrase N-GA wire is used throughout the application to indicate that various gauges may be used. In a preferred arrangement of the invention, 12-GA wire is used.

The head was designed so that the razor blades can be easily replaced when they get dull. Once the blade become dull, they can be replaced by using one of the spare blades contained within the head housing. During normal operation the blade will eventually need replacement due to normal wear and tear. If the blade is broken or damaged, it will be necessary to disassemble the head unit by removing at least one of the two screws at the end of the head. The second screw needs to be loosened enough to rotate the cap out of the way. Next the inner blade mechanism can be removed by gently pushing on the end of blade and plastic insert. Carefully pull out the assembly. Be aware that the extra blades are supplied and attached to this assembly. Note also that this assembly also holds a replacement fuse below the operational head fuse. If the operational fuse is defective then replace with the spare fuse. To replace the blade, gently push the blade collect out of the assembly. Remove and replace the blade and reassemble the head.

The rest of the metal housing, which is electrically connected to the neutral line, is connected to the second N-GA wire. The aluminum metal ground stake shown at 404 in FIG. 4 has two roles. First, the ground steak electrically acts as an "earth ground" which then allows a GFCI (Ground Fault Circuit Interrupter) circuit to be utilized. Second, the ground steak acts mechanically to hold constant tension in the power wire allowing the razor blade and metal housing to make good, continuous contact on the triplex or duplex power lines.

Figure 6A:
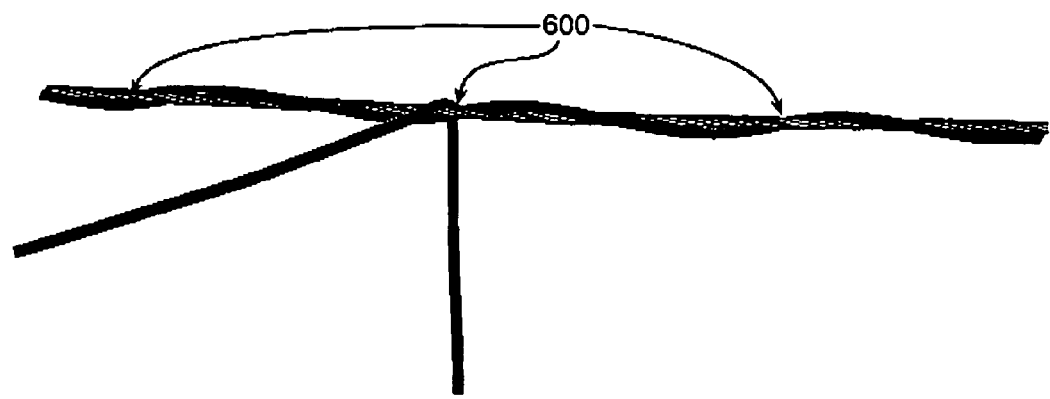
FIG. 6a illustrates the head thrown over low voltage overhead cable.
Figure 6B:
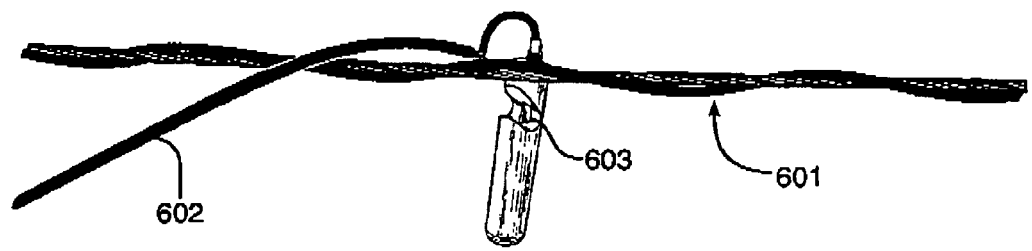
FIG. 6b illustrates the head of FIG. 6a being pulled to engage the low voltage overhead cable.
Figure 6C:
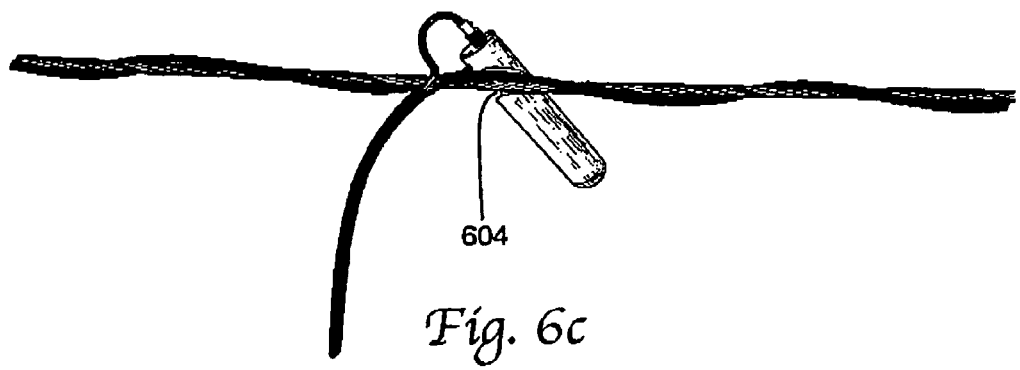
FIG. 6c illustrates the head of FIG. 6b cutting the insulation of the low voltage overhead cable.

The invention is setup on the triplex by manually throwing the head, with two wires attached, up and over low voltage wiring, as shown by the laboratory sketch of FIG. 6a. By simply pulling on the N-gauge wires from the ground, cable tension causes the razor blade to cut through the insulation of one of the hot lines. It may be helpful to think of the head as a hook. As depicted in FIG. 6a, the head has to be aligned to certain "periodic sweet-spots" 600 on the triplex or duplex cables. These "sweet spots" are locations that vary about +/−1.5" that allow for correct positioning of both the razor blade and the metal housing to make proper electrical contact into the power line (hot and neutral corresponding). Furthermore, "sweet spots" are somewhat periodic, depending on the type and number of twists per foot, etc., and vary about +/−1.5", in nature along a duplex, triplex, etc., power line. These "sweet spots" may vary in distance from 15 inches down to 3 inches in a periodic pattern across the length of the low voltage power line 601. After the lateral adjustment is completed, the trailing N-gauge wires 602 are then pulled back, as illustrated in FIG. 6b from the ground level until a slot in the head 603 makes contact 604 with the power line cables, illustrated in FIG. 6c.

The two N-gauge wires are then pulled taut at the ground level until a slot in the head makes contact with the power lines. With very little extra downward force on the head, the invention then slices through one of the hot insulated cables (100 or 200) with the razor blade. One of the two wires running to ground level are electrically connected to the razor blade. Also at this time, with the proper amount of force being applied from the ground, the invention also makes contact with the neutral cable which is electrically isolated from the razor blade. The stake is inserted into the ground to hold a constant tension in the wire which is required to keep the electrical connection at the power line. It is at this time that the wires running to the ground are ready to supply AC power to a load. One possible configuration includes an iGo AC/DC converter used to power a laptop (the load).

Figure 7:
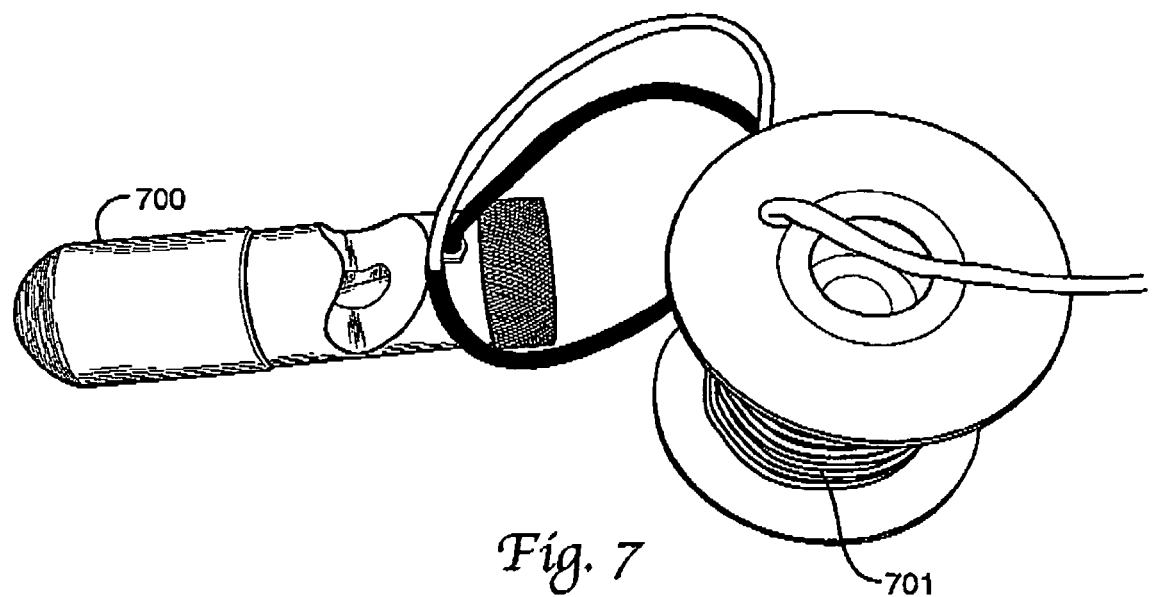
FIG. 7 shows a sketch of head design according to the arrangement of the invention.
Figure 8:
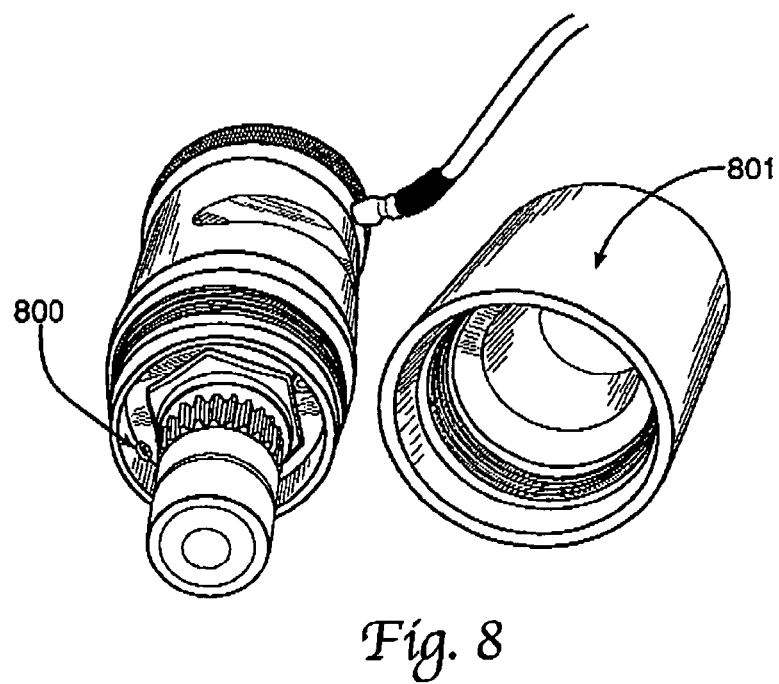
FIG. 8 shows a sketch of the head design of FIG. 6 with the top cap removed.
Figure 9:
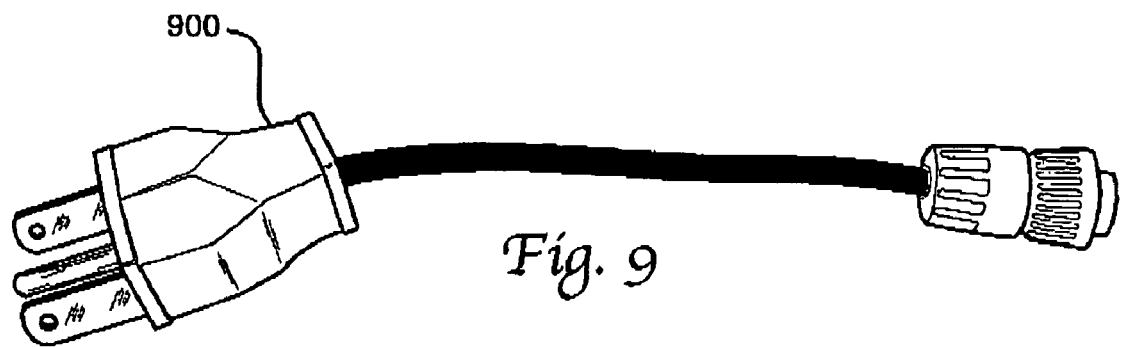
FIG. 9 shows a sketch of an AC patch cord.
Figure 10:
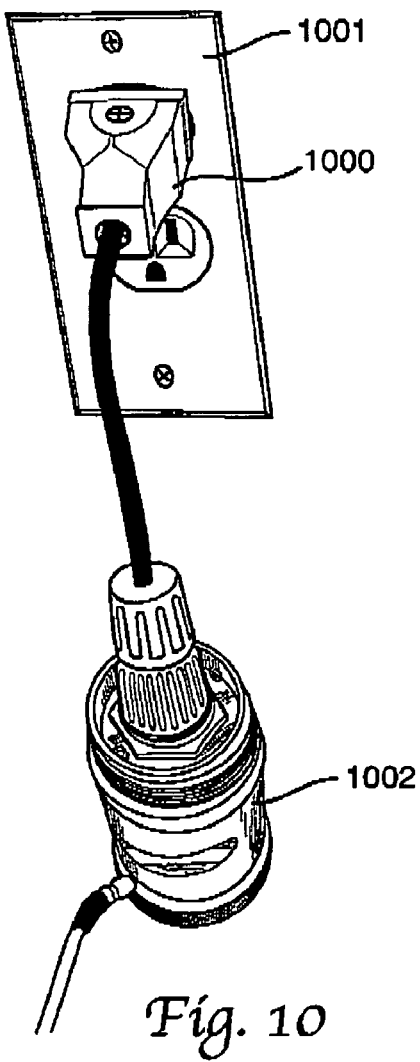
FIG. 10 shows a sketch of a head plugged into a standard AC outlet.

Sketches of the razor blade head are shown in FIGS. 7 and 8. FIG. 7 illustrates an arrangement of the invention having a watertight head 700 with strong 40 feet of wire 701. FIG. 8 further illustrates the watertight head of FIG. 7 with the safety connector for the AC plug shown at 800 and the water-tight cap shown at 801. FIG. 9 shows a sketch of an AC patch cord used in a preferred arrangement of the invention. The black safety connector shown in FIG. 8 at 800 allows an AC patch cord 900, illustrated in FIG. 9, to plug directly into the head bypassing both razor blade and the head's metal housing. For safety reasons, when disconnected, neither the razor blade nor the metal housing is connected to any power wires. The head illustrated in FIG. 7 and FIG. 8 is small and of minimal weight with features such as a 5 amp fuse with a spare fuse, a connector for standard AC outlets, a place holder for spare razor blades and includes the feature of being totally waterproof. FIG. 10 illustrates the feature of using the connector 1000 to plug the device 1002 into a standard AC outlet 1001. FIG. 10 shows the head 1002 being utilized while plugged into a standard AC outlet 1001 which basically operates similar to standard electric extension cords.

Figure 11:
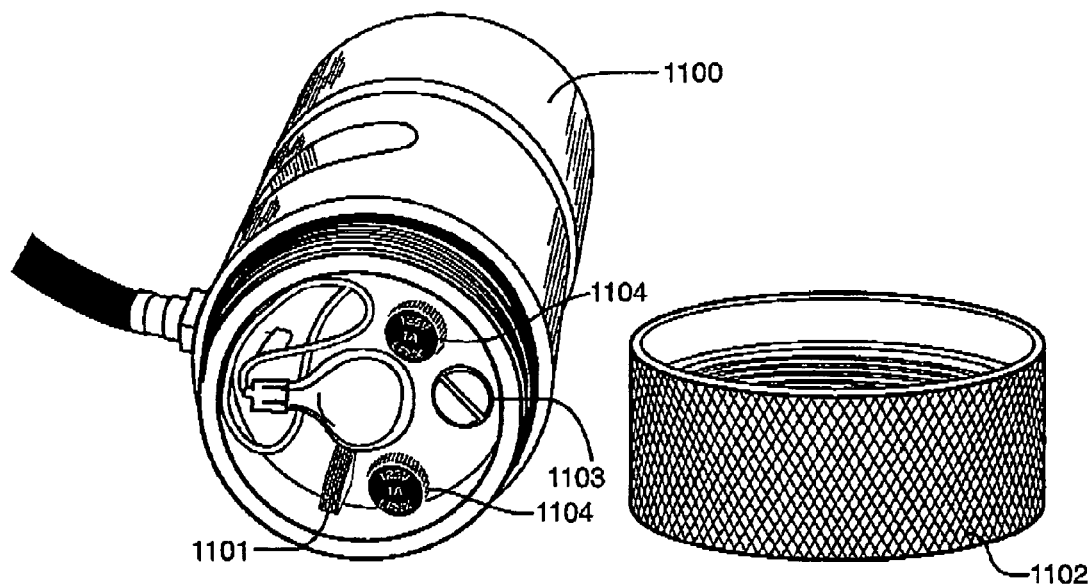
FIG. 11 shows a head with a spare blade removed.

FIG. 11 again shows various significant features of the head. In a preferred arrangement of the invention, the water-tight head is shown at 1100. Five spare razor blades are shown at 1101 for cutting the insulation of the low voltage cable and connecting with the hot line. The water-tight bottom cap is shown at 1102. The screw that holds everything in place in the head is shown at 1103 and the fuses, one live and one spare are shown at 1104. A significant aspect of the invention is the weight of the head. The weight of the head is 12 ounces.

Figure 12:
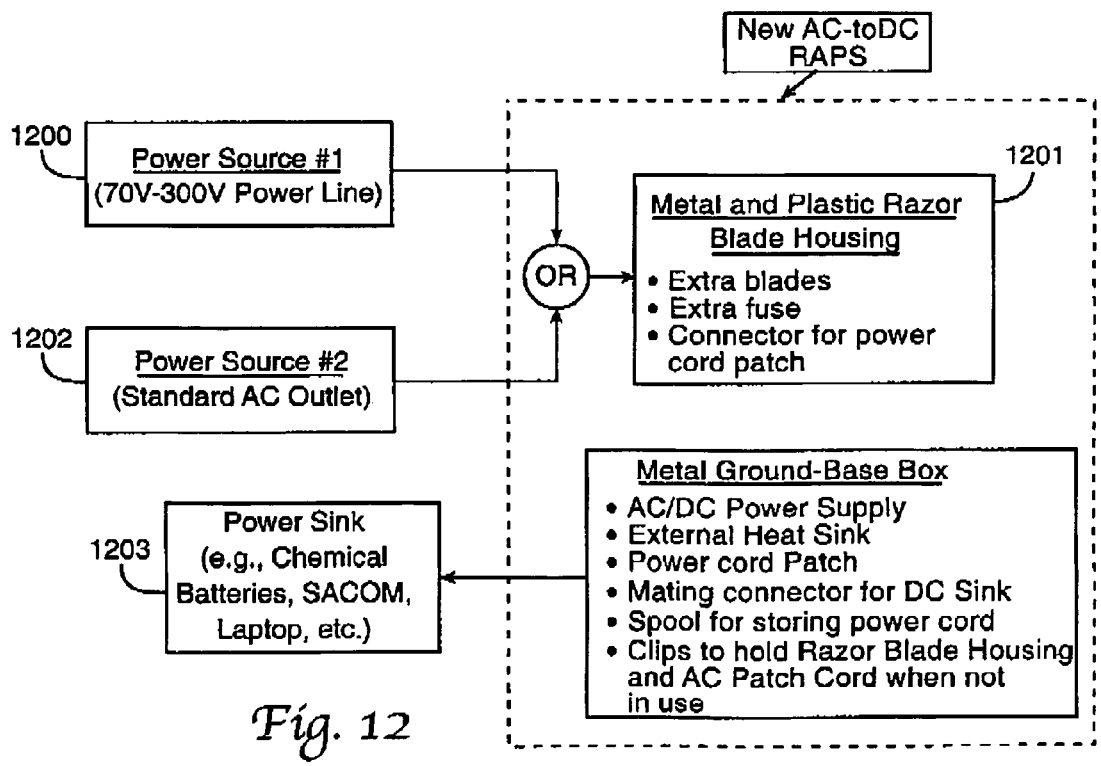
FIG. 12 shows a block diagram of a preferred arrangement of the invention.

The safest power supply arrangement of the present invention is one where the alternating current (AC) electricity is converted to direct current (DC) with all of the AC components insulated from the human user. A block diagram of this preferred arrangement of the invention is show in FIG. 12. The main electronic component is a 300 watt, 80-240 volt AC input and 30 volt DC output power supply brick shown at 1200 in FIG. 12. The head 1201 has a built in option to either connect to the power line in its normal configuration or the top of the head can be unscrewed to expose a connector. The power patch cord can be connected to the exposed connector and the AC plug can then be plugged into a standard AC outlet 1202. The AC voltage is converted to a DC voltage which is output to an external power sink 1203 of load through the output connector.

While the apparatus and method herein described constitute a preferred embodiment of the invention, it is to be understood that the invention is not limited to this precise form of apparatus or method and that changes may be made therein without departing from the scope of the invention which is defined in the appended claims.

What is claimed is:

1. A method for obtaining power from low-voltage, overhead power cables for recharging batteries and hand-held equipment comprising the steps of:
    throwing a weighted, elongated metal housing up and over a low-voltage power cable, said metal housing containing a cutout on said elongated side for seating a razor blade connected to a first N-gauge wire;
    grounding said metal housing by connecting a second N-gauge wire thereto which is connected to an aluminum metal ground stake;
    cutting insulation of said low voltage overhead power cable using said razor blade by pulling said first and second N-gauge wires and electrically connecting to a hot line of said power cable;
    providing constant tension to said elongated metal housing to maintain an electrical connection to said power cable hot line using said aluminum metal ground stake connected to said metal housing by said support cable; and
    supplying low voltage electrical power to charge batteries or equipment from said hot line of said power cable through said N-gauge wire connected to said razor blade in said metal housing.

2. The method of claim 1 wherein said throwing step further comprises the step of throwing a waterproof, weighted, elongated metal housing up and over a low-voltage power cable, said metal housing containing a cutout on said elongated side for seating a razor blade connected to a first N-gauge wire.

3. The method of claim 1, further comprising, after said throwing step, the step of adjusting said weighted, elongated metal housing laterally on said overhead cable so it is above a sweet spot of said low-voltage power cable.

4. The method of claim 1 wherein said supplying step further comprises the step of supplying low voltage electrical power to charge batteries or equipment from said hot line of said power cable through said N-gauge wire connected to said razor blade in said metal housing a female alternating current plug.

5. The method of claim 1 wherein said providing step further comprises the step of providing constant tension using a wire tension adjuster to said elongated metal housing to maintain an electrical connection to said power cable hot line using said aluminum metal ground stake connected to said metal housing by said support cable.

6. The method of claim 1 wherein said throwing step further comprises the step of throwing a waterproof, weighted, elongated metal housing up and over a low-voltage power cable, said metal housing containing a cutout on said elongated side for seating a razor blade connected to a first N-gauge wire and wherein said metal housing contains additional replacement razor blades.

7. The method of claim 1 wherein said cutting step further comprises the step of cutting insulation of said low voltage overhead power cable using said razor blade by pulling said first and second N-gauge wires and electrically connecting to a hot line of said power cable and said neutral line of said power cable.

8. The method of claim 1 wherein said throwing step further comprises throwing a weighted, elongated metal housing up and over a low-voltage power cable, said metal housing containing a cutout on said elongated side for seating a razor blade connected to a first N-gauge wire and wherein said metal housing contains an AC patch cord for plugging said metal housing into a standard AC outlet.

9. A method for obtaining power from low-voltage, overhead power cables for recharging batteries and hand-held equipment comprising the steps of:
    throwing a weighted, waterproof, elongated metal housing up and over a low-voltage power cable, said metal housing containing a cutout on said elongated side for seating a razor blade connected to a first N-gauge wire and wherein said metal housing contains additional replacement razor blades;
    adjusting said weighted, waterproof, elongated metal housing laterally on said overhead cable so it is above a sweet spot of said low-voltage power cable;
    grounding said metal housing by connecting a second N-gauge wire thereto which is connected to an aluminum metal ground stake;
    cutting insulation of said low voltage overhead power cable using said razor blade by pulling said first and second N-gauge wires and electrically connecting to a hot line of said power cable and a neutral line of said power cable;
    providing constant tension to said elongated metal housing a wire tension adjuster to maintain an electrical connection to said power cable hot line using said aluminum metal ground stake connected to said metal housing by said support cable; and
    supplying low voltage electrical power to charge batteries or equipment from said hot line of said power cable through said N-gauge wire connected to said razor blade in said metal housing a female alternating current plug.

10. A device for obtaining power from low-voltage, overhead power cables for recharging batteries and hand-held equipment comprising:
    a weighted, elongated metal housing for throwing up and over a low-voltage power cable and containing a cutout on said elongated side for seating a razor blade connected to a first N-gauge wire;

an aluminum metal ground stake for grounding said metal housing by connecting a second N-gauge wire to said metal housing and said aluminum metal ground stake;

means for providing constant tension to said elongated metal housing to maintain an electrical connection to said power cable hot line using said aluminum metal ground stake connected to said metal housing by said support cable; and an electrical connector for supplying low voltage electrical power to charge batteries or equipment from said hot line of said power cable by cutting insulation of said low voltage overhead power cable using said razor blade by pulling said first and second N-gauge wires and electrically connecting to a hot line of said power cable.

11. The device of claim 10 wherein said weighted, elongated metal housing is waterproof.

12. The device of claim 10 wherein said weighted elongated metal housing further comprises a weighted, elongated metal housing for throwing up and over a low-voltage power cable and laterally adjusting said metal housing over a sweet spot of said cable.

13. The device of claim 10 wherein said electrical connector is a female alternating current plug.

14. The device of claim 10 wherein said means for providing constant tension comprises a wire tension adjuster.

15. The device of claim 10 wherein said a weighted, elongated metal housing further comprises a weighted, elongated metal housing for throwing up and over a low-voltage power cable and containing a cutout on said elongated side for seating a razor blade connected to a first N-gauge wire and containing additional replacement razor blades.

* * * * *